Aug. 8, 1933.  J. H. RYALLS  1,921,169
BATTERY TERMINAL OR CONNECTER
Filed Oct. 4, 1929
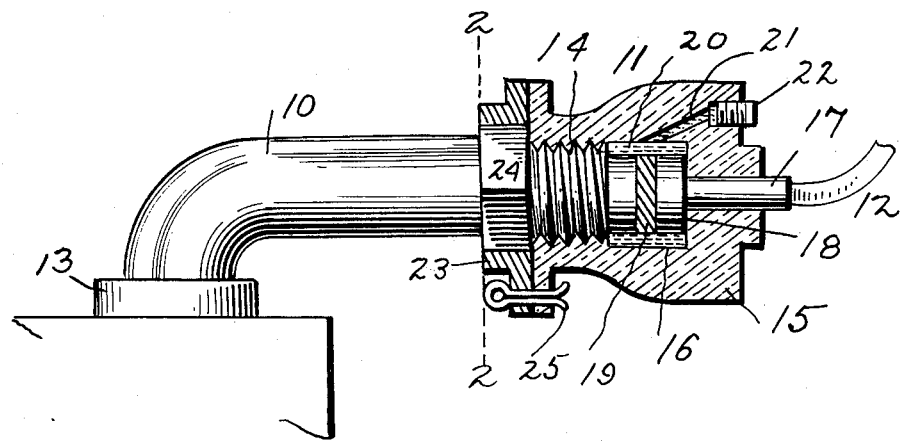
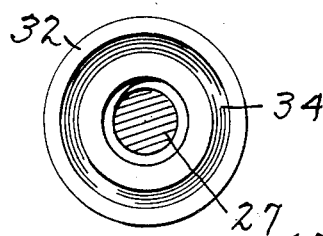
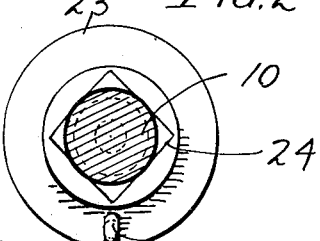
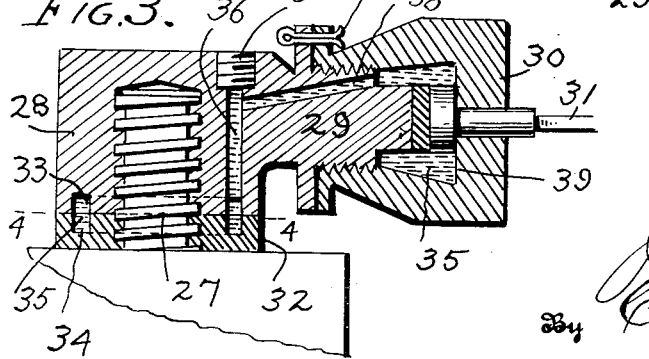
Inventor
John H. Ryalls.
By Chas. J. Williamson,
Attorney Patented Aug. 8, 1933

1,921,169

UNITED STATES PATENT OFFICE 1,921,169

BATTERY TERMINAL OR CONNECTER

John H. Ryalls, Richmond, Va.

Application October 4, 1929. Serial No. 397,348

2 Claims. (Cl. 173—259)

My invention relates to storage battery terminals. My object is to provide a terminal connecter which will diminish to the minimum, if not absolutely prevent corrosion; and to do this by a construction at once simple and efficient, and which for its original application and replacement when necessary, will require no special skill, or tools. The evils or results of corrosion or sulfation, are well known to battery users, both in regard to diminishing or impairing the battery output, and the matter of repairs and upkeep. Indeed in some cases, the cost of repair of a battery may be so great as to make it better to throw the battery away and to buy a new one. In particular are these results serious in the case of motor car batteries because so many things are affected,—the starter motor, ignition, lamps, and other electrical accessories being dependent on the battery and requiring for proper operation, the best possible condition. In making my invention I have had in view the production of a connnecter that will withstand the hard usage to which a motor car must necessarily be subjected.

My invention consists in whatever is described by or is included within the terms or scope of the appended claims.

In the drawing:—

Fig. 1 is a view partly in vertical section of a battery terminal embodying my invention;

Fig. 2 is a cross section on line 2—2 of Fig. 1.

Fig. 3 is a vertical section of another embodiment of my invention;

Fig. 4 is a section on line 4—4 of Fig. 3.

In putting my invention in use, I may use any desired construction of the terminal arm or post, 10, which is connected to the battery plates at one end, but such a post must have at its other end means such as a screw thread for engagement by the clamp device, 11, I employ to which one end of the usual lead wire, 12, is connected. The post I prefer for new construction (but do not confine myself to) is that shown in Fig. 1, which is L- or angle shape the vertical leg passing through the battery top and having a sealing nut, 13, and the horizontal leg having a screw thread, 14, at its free end which projects beyond the battery side. Fitting over such free end is a chambered cap or union nut, 15, which at one end has internal thread to engage the post thread, 14. The end of the post, 10, beyond the thread, 14, thereon is reduced in diameter, so that an annular space exists between it and the wall of the chamber, 16, in the cap. To the outer end of the cap is secured one end of the lead wire, 12, which has a tip, 17, that snugly fits a hole through the cap end, and which inside the chamber has a head, 18, opposite the reduced end of the post, 10, and preferably, of the same diameter as said reduced end. Between the latter and said head, 18, is placed a disk or washer, 19, of lead which is clamped tightly between them by the screw action of the cap. In the annular space around said parts is a filling of "Vaseline", 20, to protect the surfaces and also exclude or seal against presence of air about the contacting terminal surfaces, and thus prevent corona effect.

Through the cap or nut end a hole, 21, leads into the chamber for the introduction of the protecting and air excluding substance. The outer end of such hole is closed by a removable screw plug, 22.

Preferably the cap or nut is of glass, and its exterior is roughened to afford finger grip so that the nut can be applied and removed without a tool.

Preferably the nut or cap, 15, is provided with means to lock it from accidental turning. Such means may be the simple device shown. It comprises a ring or washer, 23, on the post, 10, adjacent the thread thereon, held from turning by having its interior squared and in contact with a square, 24, on the post. A cotter pin, 25, connects the lock ring and a flange, 26, on the adjacent end of the nut or cap, 15.

Referring to Figs. 3 and 4, I show an embodiment of my invention especially suited for application thereof to old battery post construction, which, for instance includes a short vertical lead post, 27, that projects above the battery top. Discarding the original terminal connecter parts connected with such post, I cut a screw thread thereon. To this I screw the internally threaded end, 28, of the horizontal arm or leg, 29, whose free end is formed and threaded for the chambered cap or nut, 30, with the lead wire, 31, similar to Fig. 1.

On the post, 27, between the arm end, 28, and the battery top a sealing nut, 32, is screwed, and its top surface and the arm end bottom surface are in tight contact. In the opposing sides of arm 28 and nut, 32, are formed annular grooves, 33 and 34, respectively, for sealing or air excluding substance, 35, such as grease, and to supply such substance after the parts are screwed together a channel, 36, leads from the arm end groove to the top of the arm for application to the latter of an "Alemite" grease gun, or other tool to force grease under pressure into the channel and grooves. The outer end of the channel, 36, is closed by a removable screw plug, 37. From the channel, 36, a branch, 38, leads through the arm to the end thereof in the nut chamber, 39, for supply of grease to the latter instead of through the cap, 15, in Fig. 1.

With sufficient pressure on the grease or "Vaseline", or other sealing substance, it will be forced even between the thread surfaces and between the contacting arm and sealing nut, 32, and thus air excluded from such surfaces and they are protected from attack by acid vapors tending to come from within the jar.

As shown in Fig. 3, the nut lock may be formed by a cotter pin, 40, applied to abutting flanges on arm and cap, 30.

The arm, 29, can be made of any appropriate material. It may be wholly of insulating, acid-resisting material, or of brass, aluminum, etc., coated with enamel to provide acid-resisting and non-conducting surfaces, and though I prefer glass for the cap or nut, 15, or 30, other material may be used without departing from my invention.

What I claim is:—

1. A battery connecter comprising a post, a nut on the post, an arm, screw means to hold arm and nut together, a cap to which the lead wire is connected, a screw connection between cap and arm, chambers being provided where arm and nut contact, and within said cap, and a protective substance in such chambers.

2. A battery connecter comprising a terminal post with a threaded extremity, the post having a reduced portion extending beyond the thread, a cap comprising an end wall and a side wall, the cap side wall being internally threaded to engage the post thread, the end wall of the cap having a hole for the passage of a lead wire, a lead wire extending through such hole and having at the inner side of the wall a contact-making enlargement against which the inner side of the end wall of the cap exerts pressure to secure an electrical connection between the lead wire and the end of the post encircled by the side wall of the cap.

JOHN H. RYALLS.